July 26, 1932.  C. G. CRISPIN  1,868,522
RELIEF VALVE
Filed May 2, 1930
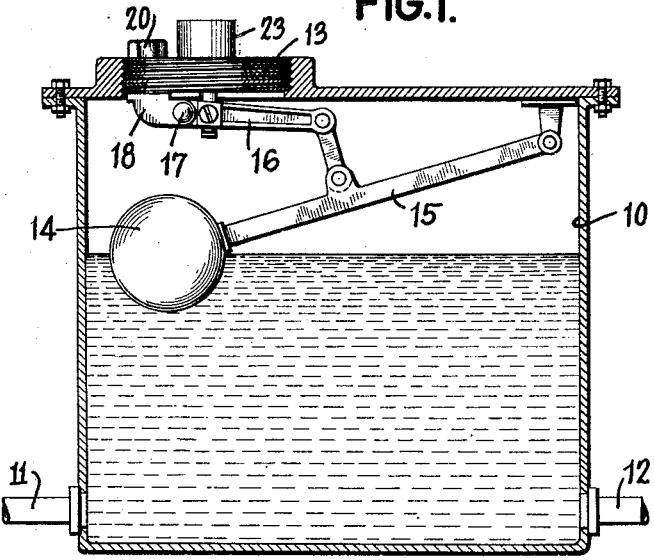
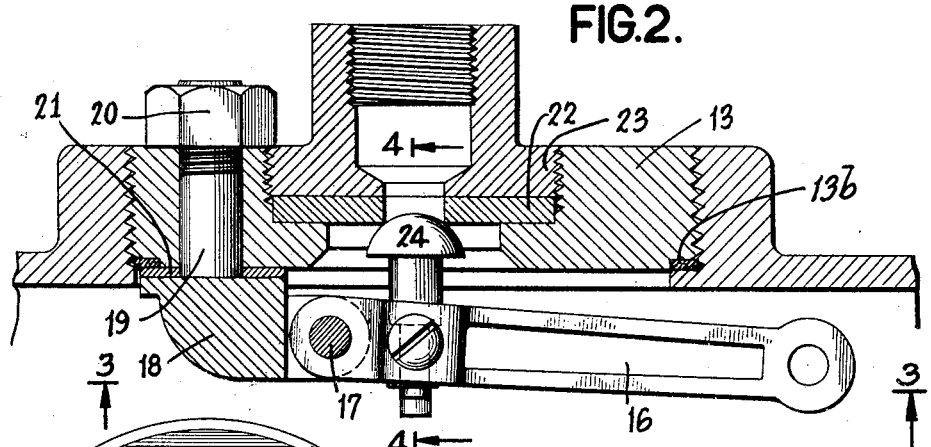
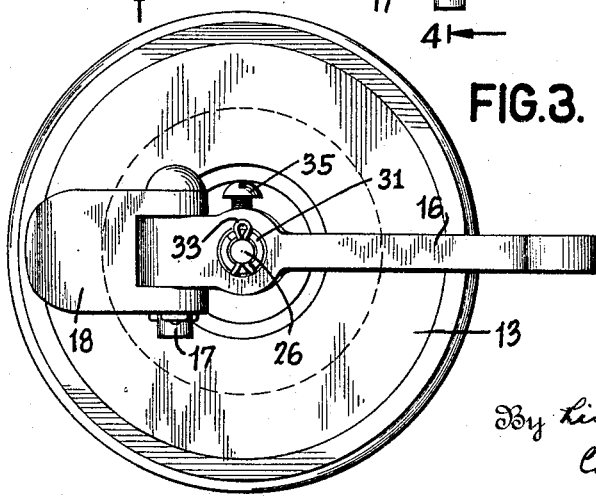
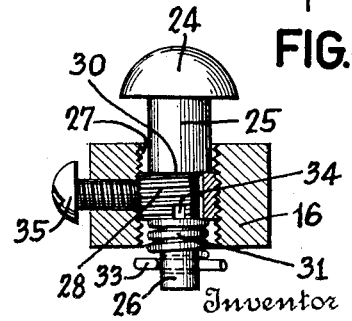
Inventor
Clarence G. Crispin
By his Attorneys
Cooper, Kerr & Dunham Patented July 26, 1932

1,868,522

UNITED STATES PATENT OFFICE

CLARENCE GEARHART CRISPIN, OF BERWICK, PENNSYLVANIA

RELIEF VALVE

Application filed May 2, 1930. Serial No. 449,136.

This invention relates to improvements in relief valves for purging pipe lines of air or gas. Such valves are usually float actuated and each valve is arranged to open to release collected air or gas and after this gas has been purged out, the valve closes under the power of the float and is thereafter expected to afford a liquid tight seal until the valve again opens to purge out further quantities of collected air or gas.

In the past difficulty has been experienced in providing a valve which affords a liquid tight seal after closure, particularly when fluids such as gasoline, benzol and the like are being handled. With such fluids, composition valve seats such as rubber or fiber seats cannot be employed because these materials are affected by the fluids. Accordingly, metallic valve parts and seats must be used and where metallic valve parts are used, difficulty is experienced in properly fitting the parts so that a tight seal may be secured under the power of the float when the valve closes.

Accordingly, one object of the present invention resides in the provision of an improved valve construction which will tightly close and effectually prevent the escape of liquid even if the liquid be gasoline, benzol or the like.

A further object of the present invention resides in the provision of an improved valve construction which is of such nature that metallic valve seats may be used cooperating with a metallic valve member and in which the parts will properly align for closing and sealing, notwithstanding the fact that non-yielding metallic valve parts are employed.

A further object of the present invention resides in the provision of a valve construction in which the valve may tilt relatively to the valve carrying and float actuated lever so that it may properly align itself with a cooperating valve seat and preferably the construction is such that such tilting for alignment is brought about by the camming action of the valve against its seat.

A further object of the present invention resides in the provision of improved details of construction of valves of this nature to the general end that a valve may be readily adjusted for proper action.

Further and other objects of the present invention will be hereinafter set forth in the accompanying specification and claims and shown in the drawing, which by way of illustration show what I now consider to be a preferred embodiment of the invention.

In the drawing:

Figure 1 shows a general assembly view of the valve and its operating parts;

Fig. 2 is a detail cross-sectional view of the valve;

Fig. 3 is a bottom view taken substantially on line 3—3 of Fig. 2; and

Fig. 4 is a detail view taken on line 4—4 of Fig. 2.

In more detail in the drawing, 10 conventionally represents a purge tank which connects to suitable pipe lines designated 11—12. 13 is the valve body suitably secured to the top of the tank 10. As shown, valve body 13 is exteriorly threaded to engage threads in the tank and a suitable gasket 13b may be provided intermediate the body and tank. Obviously, the valve body may be secured in any other desired way to the tank. 14 is a float carried by a suitably pivoted lever 15 and connected by means of a link with a valve carrying and operating lever 16. The lever 16 is fulcrumed upon a stud 17 carried by a bracket member 18 which is suitably secured to the valve body member 13. Such securing may be effected by a stud portion 19 which is threaded at its upper end to receive a nut 20. A liquid tight seal is provided by a gasket 21.

The valve body 13 is bored out to receive a metallic valve seat disc 22 and such disc may be conveniently clamped in the valve body by a plug member 23 which is threaded to engage the valve body and tapped to receive a gas vent pipe (not shown).

The valve element comprises a semi-spherical head portion 24, a shank portion 25 and a smaller shank portion 26. Intermediate portions 25 and 26 is a shoulder 30 (see Fig. 4). The valve lever 16 is provided with a threaded bored out portion 27 which is somewhat larger in diameter than the shank portion 25. Within the bored out portion 27 is a collar 28 which is exteriorly threaded to screw into the threads of lever 16. The collar 28 is also bored out with a hole through which the shank portion 26 passes with considerable clearance. The valve member is impositively held with the shouldered portion 30 against the upper edge of the collar 28 by means of a spring 31 which at its upper end abuts the lower edge of the collar and which is secured at its lower end by a cotter pin 33 which passes through the shank 26.

It will be understood that the initial position of the valve head 24 with respect to the lever 16 may be varied by adjusting the position of the collar 28 with respect to the lever 16. To provide for such adjustment, one end of the collar is provided with a transverse slot 34 to receive a screw driver. After a proper adjustment of the collar is secured, it may be locked in such position by a set screw 35.

The foregoing adjustment provides for setting the valve parts initially so that the valve member will approximately properly cooperate with the metallic valve disc or seat. In operation subsequently, the clearance around the shank 26 between it and the collar and the clearance between the shank 25 and the bored out portion 27 and the spring construction, provide for sufficient freedom for the valve to permit it to tilt slightly to properly seat upon the valve disc. In this way a liquid tight seal is made when the valve is closed and when it presses against the seat. Without providing for the tiltable action of the valve, proper seating to obtain a good seal is not readily obtainable. The tilting of the valve member with respect to the float actuated valve carrying lever is brought about by the spherical end 24 camming against the seat. By providing the tiltable valve member and mounting it so that it can relatively yield and tilt with respect to the lever 16, the power of the float is sufficient to provide a liquid tight seal. Furthermore, fully metallic non-yielding parts can be utilized for both seat and valve and a tight seal will be secured, notwithstanding the fact that the seat is not made of yielding material.

What I claim is:

1. A relief valve for pipe lines to purge the latter of air and gas and afford a liquid tight seal when closed, said valve comprising a valve seat, a valve carrying lever, a collar member which is relatively adjustable in the lever, a valve member having a shouldered portion to engage the collar member and a reduced shank portion adapted to pass with clearance through the collar member, and a spring abutting the collar member and disposed around the reduced shank portion for the purpose described.

2. A relief valve for purging purposes and for affording a liquid tight seal when closed, including a valve seat member, a valve lever and a valve member carried by said lever and cooperating with said seat, said valve member having a spherical head which cooperates with the seat and said valve member being loosely mounted in the lever and having a spring disposed to normally maintain a determined upstanding relation of the valve member with respect to the lever, said valve member being also so mounted on the lever as to tip slightly in any direction with respect thereto upon the camming engagement of the valve head with the valve seat and causing said spring to be slightly compressed upon said tipping.

In testimony whereof I hereto affix my signature.

CLARENCE GEARHART CRISPIN.